(12) United States Patent
Kondapalli et al.

(10) Patent No.: US 11,592,631 B2
(45) Date of Patent: Feb. 28, 2023

(54) OPTICAL FIBRE RIBBON HAVING BOND SHAPE

(71) Applicant: Sterlite Technologies Limited, Gurgaon (IN)

(72) Inventors: Hemanth Kondapalli, Gurgaon (IN); Kishore Sahoo, Gurgaon (IN)

(73) Assignee: Sterlite Technologies Limited, Haryana (IN)

( * ) Notice: Subject to any disclaimer, the term of this patent is extended or adjusted under 35 U.S.C. 154(b) by 0 days.

(21) Appl. No.: 17/139,685

(22) Filed: Dec. 31, 2020

(65) Prior Publication Data
US 2021/0278617 A1 Sep. 9, 2021

(30) Foreign Application Priority Data
Mar. 4, 2020 (IN) .............................. 202011009312

(51) Int. Cl.
*G02B 6/44* (2006.01)
(52) U.S. Cl.
CPC ................. *G02B 6/4403* (2013.01)

(58) Field of Classification Search
CPC .................................................... G02B 6/4403
USPC ......................................................... 385/114
See application file for complete search history.

(56) References Cited

U.S. PATENT DOCUMENTS
2019/0285823 A1* 9/2019 Tanaka ................. G02B 6/4482

FOREIGN PATENT DOCUMENTS
JP 2012103341 A * 5/2012

\* cited by examiner

*Primary Examiner* — Jerry M Blevins
(74) *Attorney, Agent, or Firm* — Steven R. Fairchild; Michael J. Pennington

(57) ABSTRACT

The present disclosure provides an intermittently bonded optical fibre ribbon. The intermittently bonded optical fibre ribbon includes a plurality of optical fibres. The plurality of optical fibres has bonded regions and un-bonded regions between adjacent optical fibres of the plurality of optical fibres. The bonded regions have a plurality of bonds. Each bonded region has a bond of the plurality of bonds joining the adjacent optical fibres such that the bond does not cover a top optical fibre region and a bottom optical fibre region of the plurality of optical fibres.

13 Claims, 3 Drawing Sheets

200

OPTICAL FIBRE RIBBON HAVING BOND SHAPE

CROSS-REFERENCE TO RELATED APPLICATIONS

The present application is based on, and claims priority from an Indian Application Number 202011009312 filed on 4 Mar. 2020, the disclosure of which is hereby incorporated by reference herein.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to the field of optical fibre and, in particular, relates to an optical fibre ribbon with concave and convex intermittent bonding.

Description of the Related Art

With the advancement of science and technology, various modern technologies are being employed for communication purposes. With the evolution of 5G and increase of data consumption in the recent years, application of data centres and Telecoms have increased drastically. In addition, large scale data centers and Telecom sectors require ultra-high fibre density cables that offers high data rate with low latency. One of the most important modern communication technologies is optical fibre communication technology using a variety of optical fibre cables. In addition, the optical fibre cables are widely used for communication to meet the increasing demands. The increasing demands of the optical fibre communication technology lead to the installation of high fibre density cables. Further, the high fibre density cables include a large number of optical fibres inside cable. The optical fibres may be in the form of optical fibre ribbons or loose fibres. Traditionally, the optical fibre ribbons are designed to facilitate up to 1728 fibres per optical fibre cable. However, linear scaling to achieve more than 3000 fibres count in conventional high fibre density cables is impractical. Traditionally, the structure of the optical fibre cables includes buffer tube, buffer tube sheath, and opticalx fibre ribbons. The buffer tube sheath protects the optical fibres from physical damage. Conventionally, poor packing efficiency of the optical fibre ribbons leads to the increase of cable diameter in the high fibre count cables. Further, the conventional high fibre density cables are inefficient at junction points and manhole installation. Furthermore, the conventional optical fibre ribbons of the conventional high fibre density cables collapse when load or force is applied at centre of the conventional optical fibre ribbons. Moreover, identification of each ribbon from the optical fibre ribbons of the conventional high fibre density cables is inconvenient.

In light of the above stated discussion, there is a need for an optical fibre ribbon that overcomes the above stated disadvantages.

BRIEF SUMMARY OF THE INVENTION

In an aspect, the present disclosure provides an intermittently bonded optical fibre ribbon. The intermittently bonded optical fibre ribbon includes a plurality of optical fibres. The plurality of optical fibres has bonded regions and un-bonded regions between adjacent optical fibres of the plurality of optical fibres. The bonded regions have a plurality of bonds. Each bonded region has a bond of the plurality of bonds joining the adjacent optical fibres such that the bond does not cover a top optical fibre region and a bottom optical fibre region of the plurality of optical fibres.

The adjacent optical fibres of the plurality of optical fibres may be in contact.

The adjacent optical fibres of the plurality of optical fibres may not be in contact.

The plurality of bonds may have at least one of a concave shape, a convex shape, and a flat shape.

The plurality of bonds may be disposed on one or more of the top ribbon region and the bottom ribbon region.

The plurality of bonds may be disposed on the top ribbon region and the bottom ribbon region such that the subsequent adjacent optical fibres are bonded alternatively at the top ribbon region and the bottom ribbon region.

The plurality of bonds may be disposed on the top ribbon region and the bottom ribbon region such that the plurality of bonds on the top ribbon region has a top bond shape and the plurality of bonds on the bottom ribbon region has a bottom bond shape. The top bond shape and the bottom bond shape may be different.

The plurality of bonds may be disposed on the top ribbon region and the bottom ribbon region such that the plurality of bonds on the top ribbon region has the top bond shape and the plurality of bonds on the bottom ribbon region has the bottom bond shape. The top bond shape and the bottom bond shape may be different. The top bond shape and the bottom bond shape is one of a concave shape, a convex shape and a flat shape.

The plurality of optical fibres in the intermittently bonded optical fibre ribbon may have a diameter in a range of 140 micrometers to 250 micrometers.

The intermittently bonded optical fibre ribbon may have a pitch in a range of about 140 micrometers to 250 micrometers.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
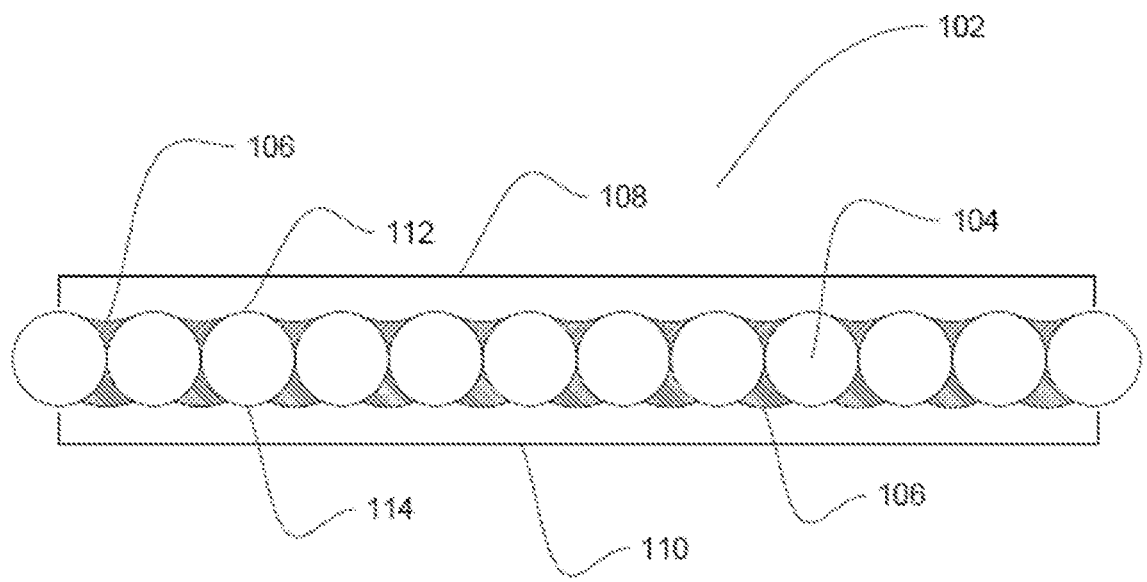
FIG. 1 illustrates a cross sectional view of an intermittently bonded optical fibre ribbon.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
100. Cross sectional view.
102. Intermittently bonded optical fibre ribbon.
104. Plurality of optical fibres.
106. Plurality of bonds.
108. The top ribbon region.
110. The bottom ribbon region.
112. The top optical fibre region.
114. The bottom optical fibre region.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

According to FIG. 1, this is a cross sectional view 100 of an intermittently bonded optical fibre ribbon 102. In general, optical fibre ribbon is used in optical fibre cables that require high fibre count within less installation space. In addition, optical fibre ribbon includes a number of optical fibres. The cross sectional view 100 includes the intermittently bonded optical fibre ribbon 102, a plurality of optical fibres 104, and a plurality of bonds 106.

The intermittently bonded optical fibre ribbon 102 includes the plurality of optical fibres 104. In general, optical fibre is a medium associated with transmission of information over long distances in the form of light pulses. In addition, optical fibre is a type of cabling technology that uses light to transmit voice and data communications over long distances. Further, optical fibre is a flexible, and transparent fibre made with silica or plastic slightly thicker than a human hair. Furthermore, the optical fibre may include a core region and a cladding region. Moreover, the core region is an inner part of the optical fibre and the cladding section is an outer part of the optical fibre. Also, the cladding region surrounds the core region. Also, the core region and the cladding region are formed during the manufacturing stage of the optical fibre. Also, the core region has a refractive index that is greater than a refractive index of the cladding region.

Number of the plurality of optical fibres 104 in the intermittently bonded optical fibre ribbon 102 may be 12. Number of the plurality of optical fibres 104 in the intermittently bonded optical fibre ribbon 102 may vary. The plurality of optical fibres 104 in the intermittently bonded optical fibre ribbon 102 may have a diameter in a range of about 140 micrometers to 250 micrometers. The diameter of the plurality of optical fibres 104 may vary. The intermittently bonded optical fibre ribbon 102 may have a pitch in a range of about 140 micrometers to 250 micrometers. The pitch of the intermittently bonded optical fibre ribbon 102 may vary. The pitch is defined as a distance between centers of two adjacent optical fibres.

The intermittently bonded optical fibre ribbon 102 includes bonded regions and un-bonded regions between adjacent optical fibres of the plurality of optical fibres 104 in a longitudinal direction. The bonded regions and the un-bonded regions form a top ribbon region 108 and a bottom ribbon region 110. The bonded regions have the plurality of bonds 106. Each bonded region has a bond of the plurality of bonds 106 joining the adjacent optical fibres such that the bond does not cover a top optical fibre region 112 and a bottom optical fibre region 114 of the plurality of optical fibres 104. The adjacent optical fibres of the plurality of optical fibres 104 may be in contact with each other. In addition, the adjacent optical fibres of the plurality of optical fibres 104 may not be in contact with each other. The plurality of optical fibres 104 may be bonded by the plurality of bonds 106 along a longitudinal direction. The plurality of bonds 106 may be made of a matrix material. In general, matrix material provides medium to bind and hold reinforcements together into solid. In addition, matrix material provides protection reinforcements from environmental damage, serves to transfer load, and provides finish, texture, color, durability and functionality. Further, matrix material provides various handling characteristics to optical fibres. The various handling characteristics include encapsulation, easy peel and breakout, hard surface and the like.

The plurality of optical fibres 104 affixes internally with each other with facilitation of the plurality of bonds 106. In general, bond is used to tie or hold optical fibres together. Each adjacent pair of optical fibres of the plurality of optical fibres 104 may be bonded by at least one bond of the plurality of bonds 106. The plurality of bonds 106 may have at least one of a concave shape, a convex shape, and a flat shape.

The plurality of bonds 106 may be disposed on one or more of the top ribbon region 108 and the bottom ribbon region 110. The plurality of bonds 106 on the top ribbon region 108 has a top bond shape and the plurality of bonds 106 on the bottom ribbon region 110 a bottom bond shape. The top bond shape and the bottom bond shape may be different. The top bond shape and the bottom bond shape may be one of a concave shape, a convex shape and a flat shape. The plurality of bonds 106 on the top ribbon region 108 may have the concave shape. In addition, the plurality of bonds 106 on the bottom ribbon region 110 may have the convex shape (as shown in FIG. 1). The matrix material takes the concave shape on the top ribbon region 108 of the plurality bonds 106. The matrix material takes the convex shape on the bottom ribbon region 110 of the plurality of bonds 106.

Number of the plurality of bonds 106 on the top ribbon region 108 of the intermittently bonded optical fibre ribbon 102 is 11. Number of the plurality of bonds 106 on the top ribbon region 108 of the intermittently bonded optical fibre ribbon 102 may vary. In addition, number of the plurality of bonds 106 on the bottom ribbon region 110 of the intermittently bonded optical fibre ribbon 102 is 11. Number of the plurality of bonds 106 on the bottom ribbon region 110 of the intermittently bonded optical fibre ribbon 102 may vary.

Total number of the plurality of bonds 106 in the intermittently bonded optical fibre ribbon 102 is 22. Total number of the plurality of the bonds in the intermittently bonded optical fibre ribbon 102 may vary. In addition, the plurality of bonds 106 may be placed intermittently between the plurality of optical fibres 104 of the intermittently bonded optical fibre ribbon 102. Further, the plurality of optical fibres 104 of the intermittently bonded optical fibre ribbon 102 may be bunched together using a plurality of binders. Furthermore, the plurality of binders includes but may not be limited to rayon threads, polyester threads, nylon threads and polypropylene tape.

The intermittently bonded optical fibre ribbon 102 may be rollable on the top ribbon region 108 due to the concave shape of the plurality of bonds 106 on the top ribbon region 108 and the convex shape of the plurality of bonds 106 on the bottom ribbon region 110. In general, rollable optical fibre ribbon consumes less space when positioned inside buffer tube.

Figure 2:
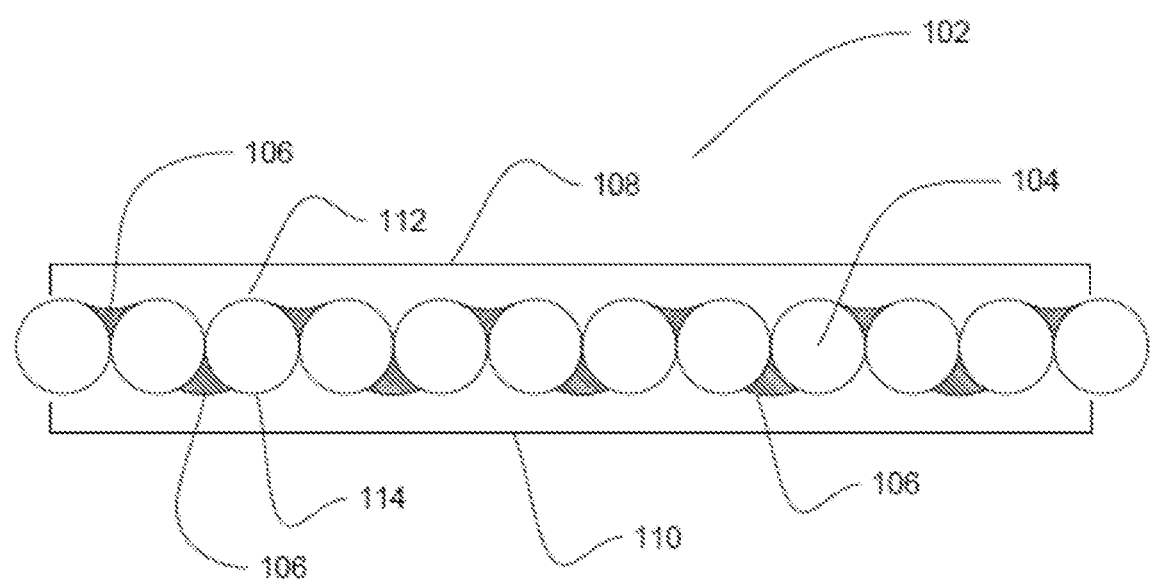
FIG. 2 illustrates a cross sectional view of the intermittently bonded optical fibre ribbon with a plurality of bonds arranged alternately.
Figure 3:
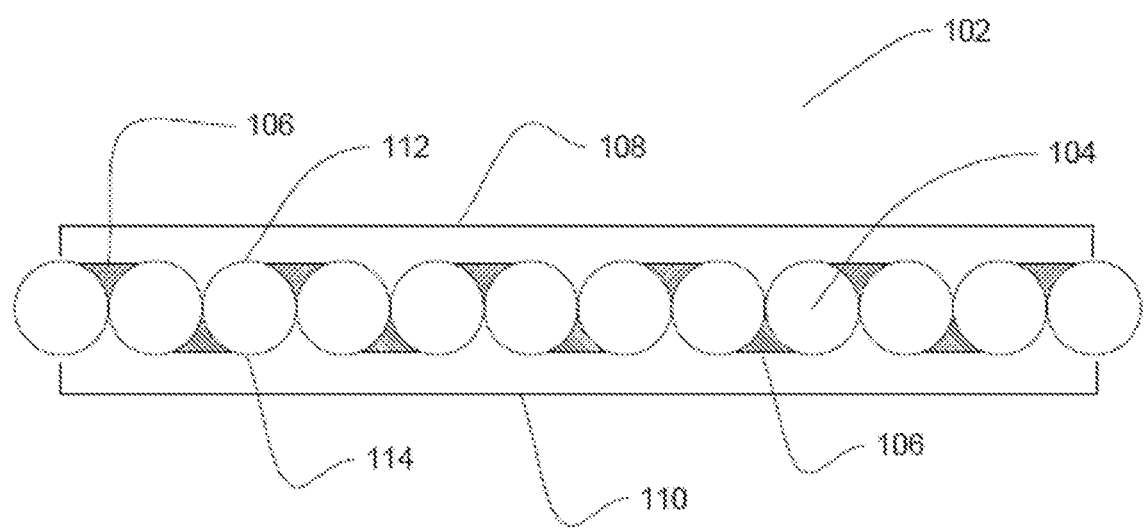
FIG. 3 illustrates a cross sectional view of the intermittently bonded optical fibre ribbon with the plurality of bonds having a flat shape.

According to FIG. 2, this is a cross sectional view 200 of the intermittently bonded optical fibre ribbon 102 with a plurality of bonds 106 arranged alternately. FIG. 3 illustrates a cross sectional view 300 of the intermittently bonded optical fibre ribbon 102 with the plurality of bonds 106 having the flat shape. The plurality of bonds 106 may be disposed on one or more of the top ribbon region 108 and the bottom ribbon region 110 such that the subsequent adjacent optical fibres are bonded alternatively at the top ribbon region 108 and the bottom ribbon region 110 (as shown in FIG. 2). The plurality of bonds 106 on the top ribbon region 108 may have the concave shape. In addition, the plurality of bonds 106 on the bottom ribbon region 110 may have the convex shape. The plurality of bonds 106 may be placed alternately on the top ribbon region 108 of the optical fibre ribbon 102. Furthermore, the matrix material takes the concave shape alternately on the top ribbon region 108 for the plurality of bonds 106. In addition, the plurality of bonds 106 is applied alternately on the bottom ribbon region 110 of the optical fibre ribbon 102. Also, the matrix material takes the convex shape alternately on the bottom ribbon region 110 for the plurality of bonds 106. The plurality of bonds 106 may be placed alternately on the top ribbon region 108 and the bottom ribbon region 110 of the intermittently bonded optical fibre ribbon 102.

Number of the plurality of bonds 106 placed on the top ribbon region 108 of the intermittently bonded optical fibre ribbon 102 may be 6 (as shown in FIG. 2). In addition, number of the plurality of bonds 106 placed on the bottom ribbon region 110 of the intermittently bonded optical fibre ribbon 102 may be 5 (as shown in FIG. 2). Further, number of the plurality of bonds 106 placed on the top ribbon region 108 and the bottom ribbon region 110 of the intermittently bonded optical fibre ribbon 102 may vary.

The plurality of bonds 106 with the concave shape and the plurality of bonds 106 with the convex shape are alternately present in between each consecutive pairs of optical fibres of the plurality of optical fibres 104. In addition, the plurality of bonds 106 with the concave shape and the plurality of bonds 106 with the convex shape are arranged in an alternate manner on one of the top ribbon region 108 and the bottom ribbon region 110 of each consecutive pairs of optical fibres 104 in the intermittently bonded optical fibre ribbon 102. Further, there are no plurality of bonds 106 with the convex shape in between same pair of optical fibres 104 throughout the longitudinal direction of the intermittently bonded optical fibre ribbon 102 when the plurality of bonds 106 with the concave shape are present. Furthermore, there are no plurality of bonds 106 with the concave shape in between same pair of optical fibres 104 throughout the longitudinal direction of optical fibre ribbon 102 when the plurality of bonds 106 with the convex shape are present (as shown in FIG. 2). The total number of bonds in a cross section of an optical fibre ribbon may be or may not be on the same line of sight in width direction.

The plurality of bonds 106 on the top ribbon region 108 and on the bottom ribbon region 110 may have the flat shape (as shown in FIG. 3). The plurality of bonds 106 may be placed alternately on the top ribbon region 108 and on the bottom ribbon region 110 of the intermittently bonded optical fibre ribbon 102. Further, the plurality of bonds 106 is placed alternately on the top ribbon region 108 of the intermittently bonded optical fibre ribbon 102. Furthermore, the plurality of bonds 106 is placed alternately on the bottom ribbon region 110 of the intermittently bonded optical fibre ribbon 102. Moreover, the matrix material takes the flat shape alternately on the top ribbon region 108 and the bottom ribbon region 110 for the plurality of bonds 106.

Number of the plurality of bonds 106 with the flat shape (as shown in FIG. 3) arranged in the alternate order on the top ribbon region 108 of the intermittently bonded optical fibre ribbon 102 is 6. In addition, number of the plurality of bonds 106 with the flat shape on the top ribbon region 108 of the intermittently bonded optical fibre ribbon 102 may vary. Further, number of the plurality of bonds 106 arranged in the alternate order on the bottom ribbon region 110 of the intermittently bonded optical fibre ribbon 102 is 5. Number of the plurality of bonds 106 on the bottom ribbon region 110 of the intermittently bonded optical fibre ribbon 102 may vary. Shape of the plurality of bonds 106 may be of any shape other than concave, convex or flat structures.

Number of the plurality of optical fibres 104 in the intermittently bonded optical fibre ribbon 102 may be 12 (as shown in FIG. 3). In addition, number of the plurality of optical fibres 104 in the intermittently bonded optical fibre ribbon 102 may vary. Further, total number of the plurality of bonds 106 in the intermittently bonded optical fibre ribbon 102 is 11. Total number of the plurality of bonds 106 in the intermittently bonded optical fibre ribbon 102 may vary. The plurality of bonds 106 may be placed intermittently between the plurality of optical fibres 104 of the intermittently bonded optical fibre ribbon 102. The plurality of optical fibres 104 of the intermittently bonded optical fibre ribbon 102 may be bunched together using the plurality of binders.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. An intermittently bonded optical fibre ribbon comprising:
a plurality of optical fibres that has bonded regions and un-bonded regions between adjacent optical fibers of the plurality of optical fibres forming a top ribbon region and a bottom ribbon region, wherein the bonded regions have a plurality of bonds, wherein each bonded region has a bond of the plurality of bonds joining the adjacent optical fibers such that the bond does not cover top optical fiber region and bottom optical fiber region of the plurality of optical fibres, wherein the plurality of bonds is disposed on the top ribbon region having a top bond shape and the bottom ribbon region having a bottom bond shape different from the top bond shape such that the subsequent adjacent optical fibres are bonded alternatively at the top ribbon region and the bottom ribbon region.

2. The intermittently bonded optical fibre ribbon as claimed in claim 1, wherein the adjacent optical fibres of the plurality of optical fibres are in contact.

3. The intermittently bonded optical fibre ribbon as claimed in claim 1, wherein the adjacent optical fibres of the plurality of optical fibres are not in contact.

4. The intermittently bonded optical fibre ribbon as claimed in claim 1, wherein the plurality of bonds have at least one of a concave shape, a convex shape, and a flat shape.

5. The intermittently bonded optical fibre ribbon as claimed in claim 1, wherein the top bond shape and the bottom bond shape is one of a concave shape, a convex shape and a flat shape.

6. The intermittently bonded optical fibre ribbon as claimed in claim 1, wherein the plurality of optical fibres in the intermittently bonded optical fibre ribbon has a diameter in a range of 140 micrometers to 250 micrometers.

7. The intermittently bonded optical fibre ribbon as claimed in claim 1, wherein the intermittently bonded optical fibre ribbon has a pitch in a range of 140 micrometers to 250 micrometers.

8. An intermittently bonded optical fibre ribbon comprising:
a plurality of optical fibres that has bonded regions and un-bonded regions between adjacent optical fibers of the plurality of optical fibres forming a top ribbon region and a bottom ribbon region, wherein the bonded regions have a plurality of bonds, wherein the plurality of bonds is disposed on the top ribbon region having a top bond shape and the bottom ribbon region having a bottom bond shape different from the top bond shape such that subsequent adjacent optical fibers are bonded alternatively at the top ribbon region and the bottom ribbon region.

9. The intermittently bonded optical fibre ribbon as claimed in claim 8, wherein the adjacent optical fibres of the plurality of optical fibres are one of in contact and not in contact.

10. The intermittently bonded optical fibre ribbon as claimed in claim 8, wherein each bonded region has a bond of the plurality of bonds joining the adjacent optical fibers such that the bond does not cover top optical fiber region and bottom optical fiber region of the plurality of optical fibres.

11. The intermittently bonded optical fibre ribbon as claimed in claim 8, wherein the top bond shape and the bottom bond shape is one of a concave shape, a convex shape and a flat shape.

12. The intermittently bonded optical fibre ribbon as claimed in claim 8, wherein the plurality of optical fibres in the intermittently bonded optical fibre ribbon has a diameter in a range of 140 micrometers to 250 micrometers.

13. The intermittently bonded optical fibre ribbon as claimed in claim 8, wherein the intermittently bonded optical fibre ribbon has a pitch in a range of 140 micrometers to 250 micrometers.

* * * * *